(No Model.)
W. & G. D. BULMER.
CAR WHEEL.
No. 246,594.  Patented Sept. 6, 1881.
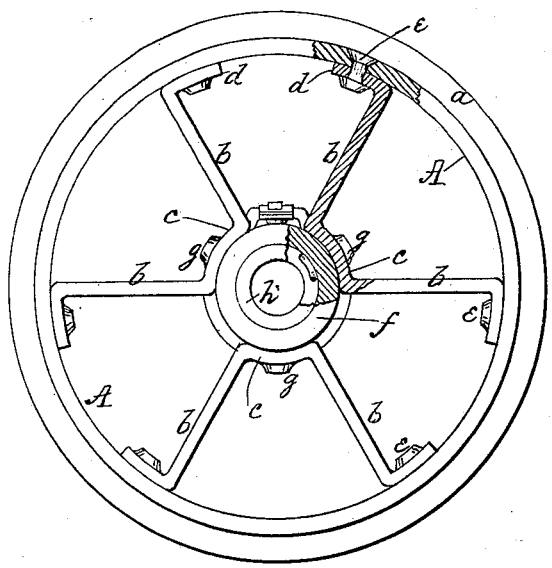
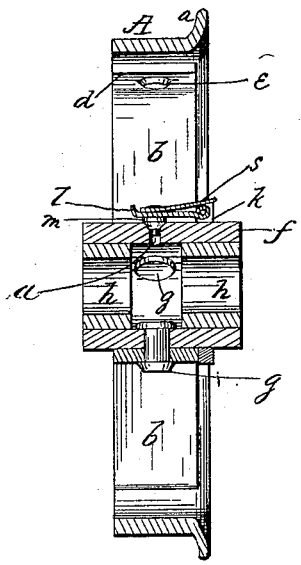
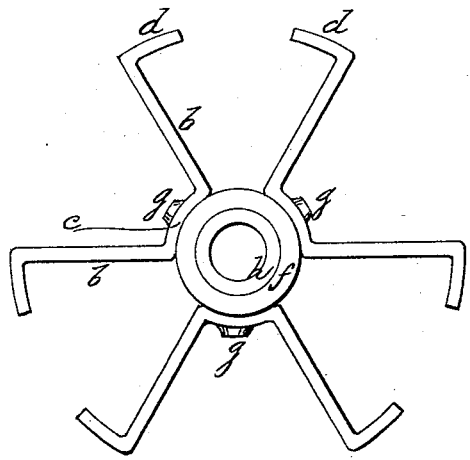
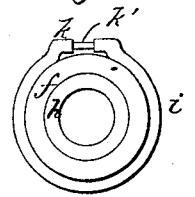
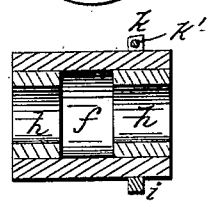
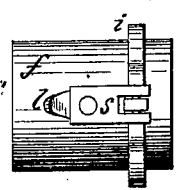
WITNESSES:
John M. Patterson
G. Smith
William Bulmer,
George D. Bulmer,
INVENTORS
Connolly Prost McTighe
ATTORNEYS

UNITED STATES PATENT OFFICE.

WILLIAM BULMER AND GEORGE D. BULMER, OF WHITE ASH, PA.

CAR-WHEEL.

SPECIFICATION forming part of Letters Patent No. 246,594, dated September 6, 1881.

Application filed June 11, 1881. (No model.)

*To all whom it may concern:*

Be it known that we, WILLIAM BULMER and GEORGE D. BULMER, of White Ash P. O., in the county of Allegheny and State of Pennsylvania, have invented certain new and useful Improvements in Car-Wheels; and we do hereby declare that the following is a full, clear, and exact description of the invention, which will enable others skilled in the art to which it appertains to make and use the same, reference being had to the accompanying drawings, which form a part of this specification, in which—

Figure 1 is a side elevation of our wheel, partly sectional. Fig. 2 is a transverse vertical section. Fig. 3 is a view of hub and spokes. Fig. 4 is an end view of hub with ring. Fig. 5 is a longitudinal section of same, and Fig. 6 is a plan view of same.

Our invention has for its object the construction of car-wheels entirely of wrought-iron or wrought-iron and steel; and it consists in the construction and combination of parts, as hereinafter fully described and claimed In our improved wheel the hub, spokes, and rim are all separate parts, joined together as we shall describe.

The rim consists of a wrought-iron band, A, bent to shape and welded. Before or after welding, the flange $a$ may be worked up, or the rim A may be bent up out of a bar of L-shaped iron.

The spokes are formed in pairs by taking a flat bar of iron, bending into V shape, forming the spokes $b$, and at their junction forming a concave, $c$, to fit the hub, and then bending the outer ends of spokes $b$ convex, to form the lips $d$, which fit inside the rim A. The rim A and lips $d$ are drilled or punched, as shown, the rim being countersunk outside, and they are joined together by the rivets $e$, which may be of iron; but we prefer to make them of steel, so that when the wheel is in use the rivet-heads will stand the wear properly. The concaves $c$ of the pairs of spokes $b\ b$ are also bored or punched for attachment to the hub.

The hub consists of a cylindrical piece of wrought-iron, $f$, whose interior opening is larger than the desired size, and large enough to admit of the insertion of the rivets $g$ from the inside radially outward through holes in the hub, as shown. After setting the rivets $g$ the spokes $b$ are placed with concave $c$ against the hub and rivets $g$ passing through. Then the rivets $g$ are headed up outside the concaved ends of the spokes, thereby holding them in place firmly and rigidly. The rim A is put on in the manner described after the spokes have been secured to the hub. In each end of the hub $f$ we set a steel bushing, $h$, by heating the hub and shrinking it onto the steel bushings $h$. This leaves an internal space on the rivet-line for oil or lubricant, and the steel bushings form a hard and durable bearing for the axle. Upon the hub $f$ we shrink or otherwise fix a band, $i$, having a raised square portion, $k$, as shown, whose middle portion, $k'$, is shaped round, as shown. Upon this we hinge a plate, $l$, by bending its end around the pintle $k'$. In this arrangement the plate $l$ has movement down upon the hub, or up away from it, and is provided on its under face with a pointed gum or other suitable stopper, $m$, which fits in and fills the oil-hole $n$ of the hub. A wide plate-spring, $s$, is riveted on the plate $l$, so as to bear upon the square portion $k$ of the ring $i$, and this holds the plate $l$ either down or up, as required. The whole forms a most convenient cover for the oil-hole $n$ of the hub, so that while the wheel is in use and revolving the oil cannot run to waste; and the pointed stopper $m$ prevents the accumulation of dirt in the oil-hole.

If desired, the rim or tread A may be heated before being fitted on spokes $b$, so that it will shrink in cooling and become, as it were, almost integral therewith.

We claim as our invention—

1. The combination of the rim A, having flange $a$, spokes $b\ b$, in integral pairs, having lips $d$ and concave $c$, rivets $e$, with hub $f$, internal bushings $h$, and rivets $g$, constructed and arranged substantially as described.

2. The combination of hub $f$, having oil-hole $n$, ring $i\ k$, its pintle $k'$, hinged plate $l$, having stopper $m$, and spring $s$, substantially as described.

In testimony that we claim the foregoing as our own we have hereto affixed our signatures in presence of two witnesses.

WILLIAM BULMER.
GEORGE D. BULMER.

Witnesses:
T. J. MCTIGHE,
A. V. D. WATTERSON.